United States Patent [19]

Geeck, III

[11] 4,454,706

[45] Jun. 19, 1984

[54] POWER MOWER WITH BLADE-BRAKE CLUTCH

[76] Inventor: Joseph S. Geeck, III, 6355 Jefferson Hwy., Harahan, La. 70123

[21] Appl. No.: 412,132

[22] Filed: Aug. 27, 1982

Related U.S. Application Data

[63] Continuation-in-part of Ser. No. 358,656, Mar. 16, 1982, abandoned.

[51] Int. Cl.³ .................. A01N 69/08; A01D 69/10
[52] U.S. Cl. ........................... 56/11.3; 56/11.6; 56/DIG. 18; 192/11
[58] Field of Search ............... 56/11.3, 11.6, DIG. 18; 192/10, 11

[56] References Cited

U.S. PATENT DOCUMENTS

| | | | |
|---|---|---|---|
| 1,936,389 | 11/1933 | Hallquist | 267/140.4 |
| 2,523,171 | 9/1950 | Willey | 56/DIG. 18 |
| 2,566,164 | 8/1951 | Callison | 56/DIG. 15 |
| 2,697,904 | 12/1954 | Goudie | 56/11.6 |
| 2,838,267 | 6/1958 | Well | 248/358 |
| 2,855,742 | 10/1958 | Cooper et al. | 56/11.6 |
| 2,857,726 | 10/1958 | Smith | 56/11.6 |
| 2,875,870 | 3/1959 | Mesrobian | 192/0.094 |
| 2,957,561 | 10/1960 | Musgrave | 192/11 |
| 3,367,459 | 2/1968 | Rubin | 192/11 |
| 3,474,487 | 10/1969 | Resag et al. | 188/77 R |
| 3,570,637 | 3/1971 | Pitman et al. | 192/11 |
| 3,583,531 | 6/1971 | Besoyan | 188/77 R |
| 3,658,159 | 4/1972 | Mallinger | 188/77 R |
| 3,764,156 | 10/1973 | Nepper et al. | 56/DIG. 18 |
| 4,022,180 | 5/1977 | Bosma | 56/10.5 |
| 4,033,098 | 7/1977 | Green | 56/DIG. 18 |
| 4,058,957 | 11/1977 | Roseberry | 192/11 |
| 4,090,345 | 5/1978 | Harkness | 56/10.5 |
| 4,148,173 | 4/1979 | Hoff | 56/11.3 |
| 4,152,884 | 8/1979 | Gandrud et al. | 56/202 |
| 4,195,466 | 4/1980 | Heismann | 56/10.5 |
| 4,213,288 | 7/1980 | Takeuchi et al. | 56/11.6 |
| 4,309,862 | 1/1982 | Carlson | 56/10.5 |

*Primary Examiner*—Paul J. Hirsch
*Attorney, Agent, or Firm*—John F. Sieberth

[57] ABSTRACT

The mower is equipped with a pulley and a stationary belt which rapidly stops rotation of the shaft carrying the cutting blades. When this braking system is functioning, the belt and pulley system connecting the engine with a drive pulley mounted on the same shaft is disconnected. When the braking system is released, the pulley system between the engine and the drive pulley is connected.

35 Claims, 14 Drawing Figures

POWER MOWER WITH BLADE-BRAKE CLUTCH

REFERENCE TO RELATED APPLICATION

This is a continuation-in-part of prior co-pending application Ser. No. 358,656, filed Mar. 16, 1982 and now abandoned.

TECHNICAL FIELD

This invention relates to power equipment of enhanced safety during use. More particularly, this invention relates to power mowers having a unique, simple and highly-effective blade-brake clutch system.

BACKGROUND

For decades the power equipment industry has been working on ways of reducing the hazards associated with power mowers and other like equipment having blades which operate at high speeds. Despite this effort, the Consumer Products Safety Commission has found it necessary to require that all walk behind lawn mowers manufactured affer June 30, 1982 be designed so that the mower blade will stop within three seconds after the operator's hands have been removed from the handle. To accomplish this, there are two general approaches that may be used. One involves stopping the engine by means of an automatic switch or the like which is activated upon release of the handle. While effective, this approach is troublesome and wasteful as it necessitates frequent re-starting of the engine.

The other approach, which involves use of a brake and clutch systems which will stop the blade and yet allow the engine to keep running, is a more desirable way to proceed. However, in practice it has been found very difficult to devise a system which is simple, inexpensive and highly effective.

SUMMARY OF THE INVENTION

Power equipment having a simple, inexpensive and highly-effective blade-brake and clutch system has now been provided by this invention. Besides being simple and inexpensive in construction and use, the power mower assemblies of this invention are durable, trouble-free and efficient. For example, it has been found possible to cause the blade of a walk behind power lawn mower of this invention to be stopped in about one second. Furthermore, no wear of the blade-brake system was noted even after 100 hours of mower operation.

In accordance with one aspect of this invention there is provided in a power mower comprising a prime mover, rotatable grass cutting means, and power transmission means operatively connecting the prime mover with the rotatable grass cutting means to cause rotation of said cutting means, the improvement which comprises the combination of (a) means for disconnecting said transmission means, and
(b) means including a pulley and a stationary belt for stopping rotation of said cutting means concurrently with the disconnection of said transmission means.

Thus, in a preferred embodiment the braking means for stopping rotation of the cutting means comprise (i) a pulley operatively connected with the cutting means,
(ii) a stationary belt adapted to be brought into frictional engagement with the pulley to stop its rotation, and
(iii) means causing the stationary belt to be brought into frictional engagement with the pulley concurrently with the disconnection of the power transmission means.

To effect the operative connection between the pulley and the cutting means, preferably the pulley is mounted on the rotatable shaft to which the cutting means are secured although, of course, many other arrangements are feasible such as mounting the pulley on another rotatable shaft which in turn is operatively connected by gears or the like to the shaft carrying the cutting means.

Preferably the power mower is a walk behind rotary lawn mower, but the principles of this invention can be applied equally well to rider type mowers and in fact to a wide variety of power tools in which it is desired to quickly stop rotating blades or the like without stopping the prime mover itself.

In the walk behind power mowers of this invention it is preferred that a handle be pivotally mounted thereon so that (a) when said handle is pivoted into a forward position on the mower by the application of forward pressure upon said handle, said power transmission means operatively connect the prime mover (preferably but not necessarily an internal combustion engine) with said grass cutting means, and
(b) when said handle is pivoted into a rearward position on said mower, said power transmission means is disconnected and concurrently said belt is brought into frictional engagement with said pulley thereby stopping rotation of said grass cutting means.

In a further preferred embodiment the handle is pivoted into said rearward position at least in part by the weight of the prime mover. However, the handle may be caused to return to the rearward position in various other ways, such as by the use of springs or the like. It will be noted that by use of such pivotally mounted handles, the operator cannot move away from the mower with the cutting blades remaining in operation because as soon as the operator releases the handle of the rotating mower, the handle pivots from the forward to the rearward position so that the power transmission means are disconnected and the braking system is applied.

In still another preferred embodiment manually actuatable locking means are associated with the pivotable handle of the walk behind mower to lock the handle in its forward position during the time (and only during the time) the locking means are being manually actuated by the operator. This feature enables the operator to pull back on the handle to raise the forward wheels of the mower for steering purposes or the like without causing the power transmission means to be disconnected and the braking system to be applied. But as soon as the operator ceases to actuate the locking means (e.g., by releasing manual pressure from a lever, trigger, button or similar device) the locking means cease functioning. Thus once the operator releases the handle and the locking means of the operating mower, the handle returns to the rearward position, the power transmission means are disconnected and the braking system is applied. Thus, here again the operator cannot move away from the mower with the cutting blades remaining in operation.

Although various handle designs can be employed, it is preferred that the handle comprise a generally horizontal segment and an upwardly and rearwardly extending segment adapted to be grasped at its upper portion by the operator, the handle being pivotally mounted to the mower at laterally positioned points of rotation intermediate the length of the generally horizontal segment. Both such sections can be formed from laterally spaced metal tubing having a cross-bar or hand grips at the upper portion.

In a particularly preferred embodiment the engine is mounted on the mower by means of upwardly extending pivotally mounted supports so that the engine and the generally horizontal segment of the handle are capable of limited independent pivotal rotation between forward and rearward positions. Further, the engine is connected to the generally horizontal segment of the handle by force absorbing means (e.g., one or more extensible coil springs) capable of transmitting a pulling force to cause the engine to pivotally rotate into the forward position when the handle is pivoted into the forward position on the mower by the application of forward pressure upon the handle by the operator. Such force absorbing means function to dissipate force in excess of a predetermined amount of pulling force and thereby prevent the application of an excessive amount of force to the engine when the handle is pushed into the forward position by the operator. This in turn prevents excessive wear and tear or premature breakage of the power transmission means (preferably composed of a belt and pulley system, most preferably a mule drive belt and pulley system).

The rider type mowers of this invention preferably are equipped with means including a foot pedal causing the power transmission means to operatively connect the engine with the rotatable grass cutting means when the foot pedal is depressed and when the pedal is released the power transmission means are disconnected and the braking system is applied. However, if desired, manually actuated levers or the like may be used for this purpose in lieu of the foot pedal.

In another aspect of this invention there is provided in a power mower comprising a prime mover, grass cutting means mounted on a shaft, and transmission means for transmitting power from the prime mover to the shaft to cause the grass cutting means to rotate, the improvement which comprises
(a) said prime mover and said shaft being mounted in moveable relationship to each other whereby
  (i) relative movement between the prime mover and the shaft to a preselected first position causes engagement of said transmission means so that power to rotate the cutting means is transmitted from the prime mover to the shaft, and
  (ii) relative movement between the prime mover and the shaft to a preselected second position causes disengagement of said transmission means so that power to rotate the cutting means is not transmitted from the prime mover to the shaft; and
(b) said power mower including braking means for stopping rotation of said cutting means, said braking means being actuated upon relative movement between the prime mover and the shaft from said first position to said second position.

This invention provides in still another of its embodiments a blade-brake assembly for stopping rotating blades or the like powered by a prime mover without stopping the prime mover which comprises
(a) a rotatable shaft for carrying a blade or the like;
(b) means for transmitting rotary motion to said shaft;
(c) at least one pulley mounted on said shaft;
(d) a stationary belt adapted to be brought into frictional, rotation-stopping engagement with said pulley; and
(e) means for bringing the stationary belt into frictional, rotation-stopping engagement with said pulley and for interrupting the transmission of the rotary motion to said shaft.

As noted, the transmission of power from the prime mover to the shaft is interrupted or discontinued without stopping the prime mover itself.

These and other embodiments and features of the invention will become still further apparent from a consideration of the ensuing description, appended claims, and accompanying drawings.

DESCRIPTION OF PREFERRED EMBODIMENTS

Figure 1:
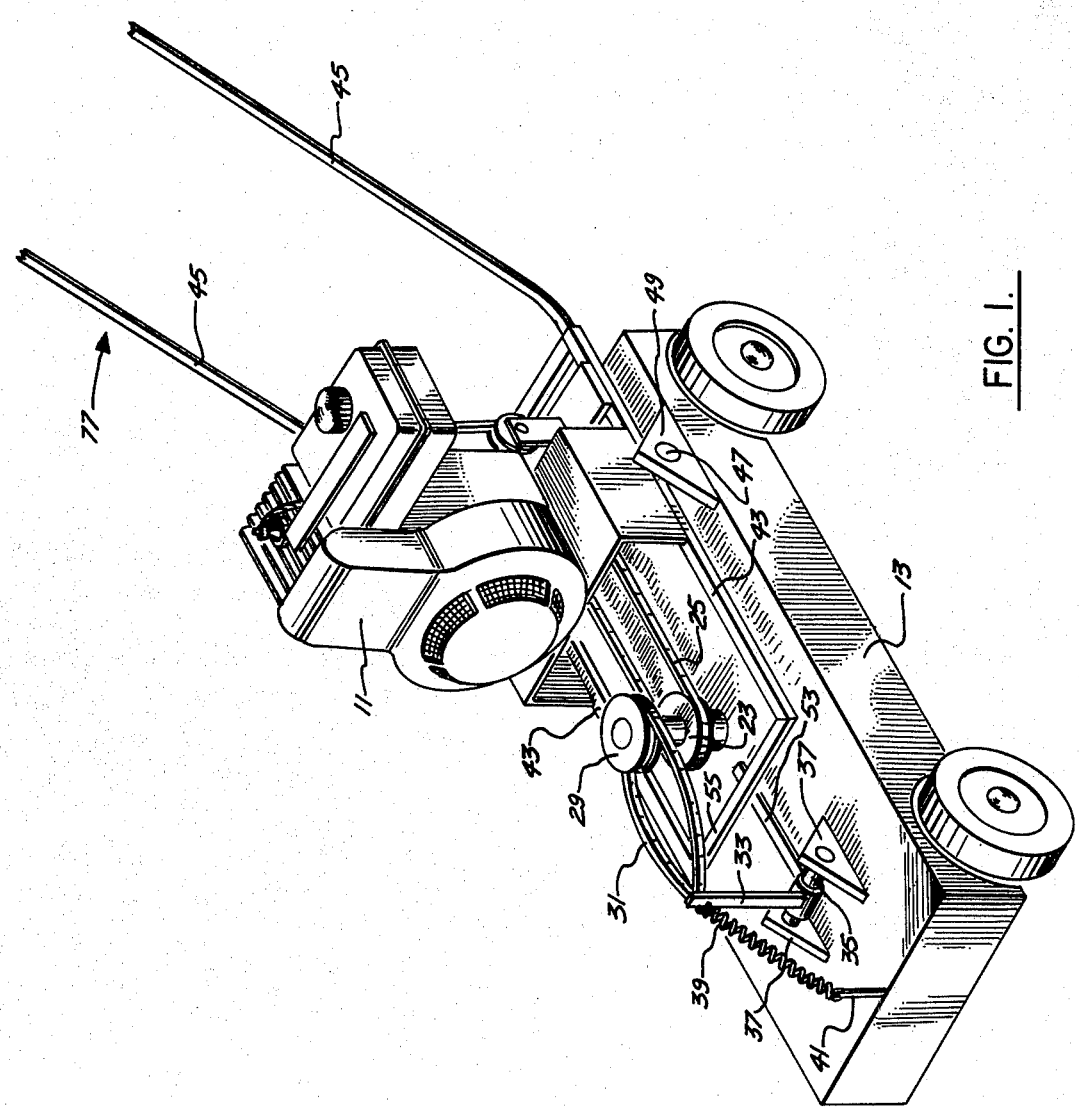
FIG. 1 is a view in perspective of one form of walk behind mower of this invention.

Referring now to the drawings wherein like parts are identified by like numerals, the power mowers in the forms depicted comprise engine 11, body 13, cutter blades 15 mounted on rotatable shaft 17, and a power transmission system composed of drive shaft 19, pulley 21 secured to shaft 19, pulley 23 secured to shaft 17 and drive belt 25 carried by pulleys 21 and 23. While various arrangements are suitable, it is preferable that the power transmission system further comprise a pair of laterally positioned idler pulleys 27, 27 (only one of which can be seen in FIGS. 2-5 and 9-12) with pulleys 21, 23, 27, 27 and drive belt 25 arranged in a mule drive configuration so that when belt 25 is under tension it is driven by pulley 21 and drives pulley 23 while riding on idler pulleys 27, 27 positioned therebetween.

The braking system of the mowers in the forms depicted comprises stationary belt 31 secured to member or arm 33 and engageable with stop pulley 29 mounted on shaft 17. Arm 33 is pivotally mounted on body 13 by means of axle 35 riding in bearing plates 37, 37. Arm 33 is adapted to pivot toward and away from stop pulley 29 and thereby cause stationary belt 31 to tighten on or loosen from stop pulley 29. Coil spring 39, secured at one end to arm 33 and at its other end to body 13 by means of fastener 41, is positioned to exert tension on arm 33 tending to pivot the arm away from stop pulley 29. Stationary belt 31 is preferably of a V-belt configuration (i.e., it has a frusto-conical or wedge-shaped cross-section) corresponding to the configuration of the rim of stop pulley 29, and should be made of a strong, tough, abrasion-resistant flexible, yet relatively inelastic material. Belts of the type commonly used as automative fan belts are suitable for the purpose. The stop pulley may be a single rimmed pulley used in combination with one stop belt (as shown), although of course even greater traction may be achieved by use of a double rimmed stop pulley accommodating a pair of adjacently-positioned stationary belts secured to arm 33.

Stationary belt 31 is solidly secured to arm 33 so that it cannot rotate with stop pulley 29. Thus when stationary belt 31 is tightened on stop pulley 29 by the tension exerted by spring 39, the frictional engagement between belt 31 and pulley 29 rapidly stops rotation of pulley 29, shaft 17 and cutter blades 15.

In the walk behind mowers in the forms depicted in FIGS. 1 through 5 and 9 through 12, a handle depicted generally by the numeral 77 and composed of a generally horizontal segment 43, 43 and an upwardly and rearwardly extending segment 45, 45 is pivotally mounted on the mower by means of axle 47 riding in a pair of laterally positioned bearing members 49, 49 (only one of which can be seen in FIGS. 1-5 and 9-12). Preferably the laterally positioned points of rotation on axle 47 are intermediate the length of segment 43 of the handle (as shown) although other pivotal arrangements are feasible and may be employed. It will be noted that pivotal mounting of handle 77 to the mower in this fashion enables the handle to be pivoted from its normal rearward position (shown in FIGS. 2 and 4, and in FIGS. 9 and 11) to a forward position (shown in FIGS. 1, 3 and 5, and in FIGS. 10 and 12) by the application of forward pressure upon the handle as at hand grips 51, 51 (only one of which is visible in FIGS. 2-5 and 9-12) by the operator.

Another preferred feature of the invention depicted in the walk behind mowers of FIGS. 1-5 and 9-12 is that engine 11 is positioned with its center of gravity approximately over and most preferably slightly to the rear of, axle 47. This enables the weight of the engine to be utilized in returning handle 77 from its forward position to its normal rearward position when the handle is released by the operator. But at the same time, by having the center of gravity of engine 11 in proximity to the rotational axis defined by axle 47 the operator does not have to exert an excessive amount of force to lift the engine from its position shown in FIGS. 2 and 9 to that shown in FIGS. 3 and 10, or to tilt the engine from its position shown in FIGS. 4 and 11 to that shown in FIGS. 5 and 12.

As seen in FIGS. 1-5 and 9-12 a rearwardly projecting lever arm 53 is secured to arm 33 (which projects upwardly) and is positioned to be engaged and depressed by the forward end portion of handle 77. In the particular form depicted in FIG. 1 this forward end portion of the handle is composed of cross-bar 55 connecting the laterally spaced horizontal segments 43, 43.

It can be seen therefore that when the operator applies forward pressure upon handle 77 the forward end portion of the handle such as cross-bar 55 depresses lever arm 53 from its position shown in FIGS. 2, 4, 9 and 11 to the position shown respectively in FIGS. 3, 5, 10 and 12. In this operation the leverage achieved from the conjoint action of handle 77 and lever arm 53 overrides the tension exerted by spring 39 and causes arm 33 to pivot toward stop pulley 29 thereby loosening stationary belt 31 from stop pulley 29 so that shaft 17 and cutter blades 15 are free to rotate. In short, forward pressure on the handle causes the braking system to release.

Figure 2:
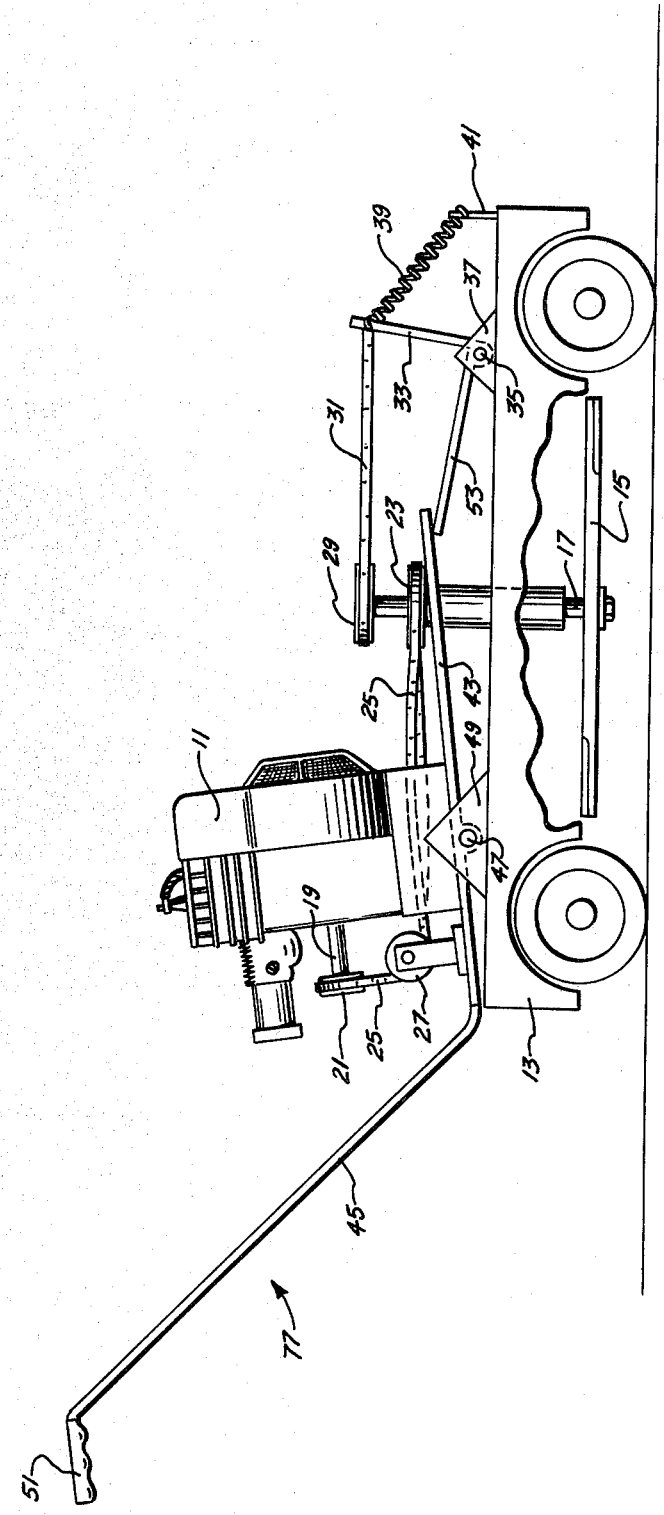
FIG. 2 is a side elevation, partly broken away, of the mower of FIG. 1 in which the handle is in the normal rearward position so that the braking system is applied and the power transmission system is disconnected.
Figure 3:
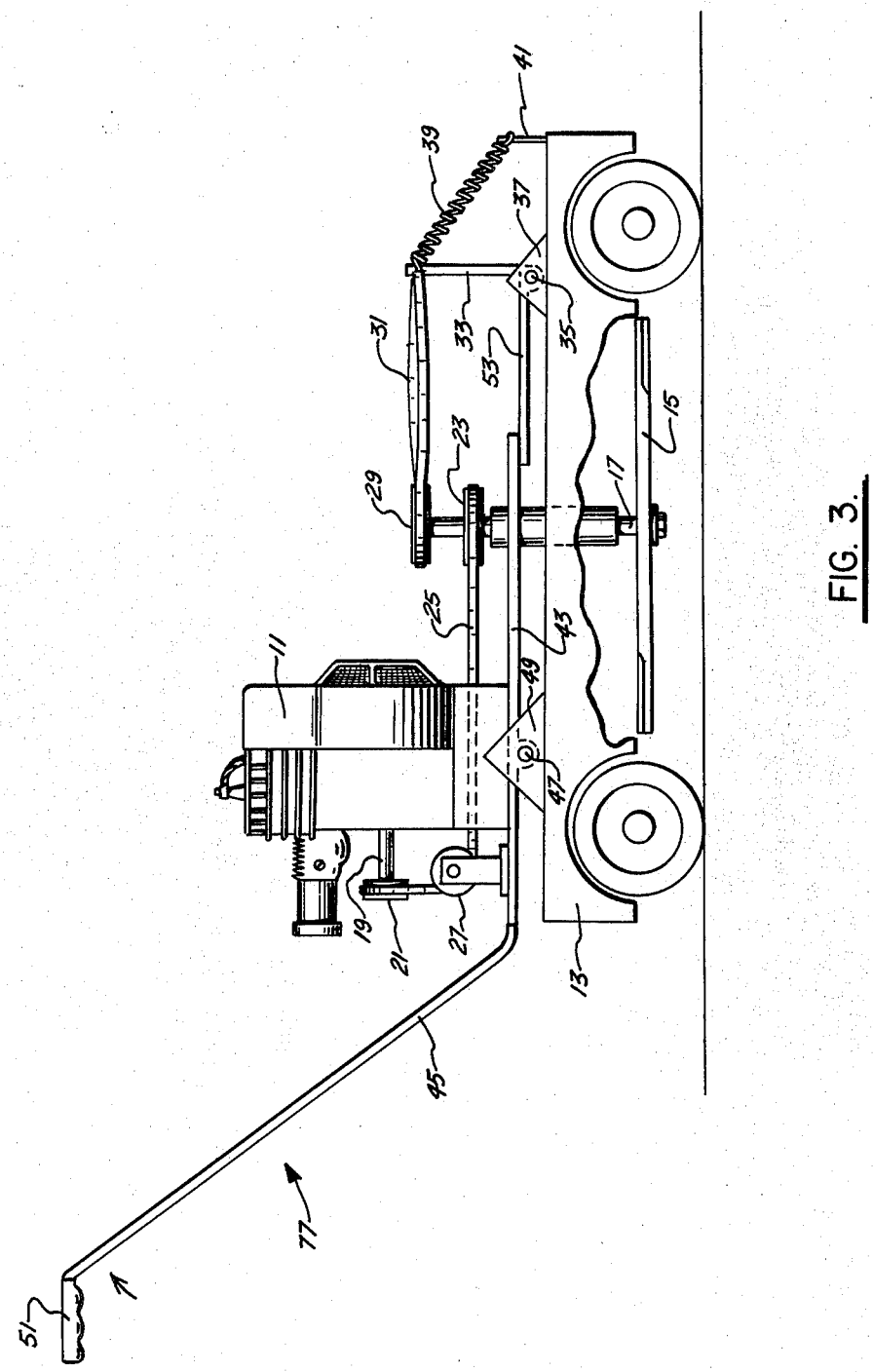
FIG. 3 is a side elevation, partly broken away, of the mower of FIG. 1 in which the handle is in the forward position so that the braking system is released and the power transmission system is connected.
Figure 4:
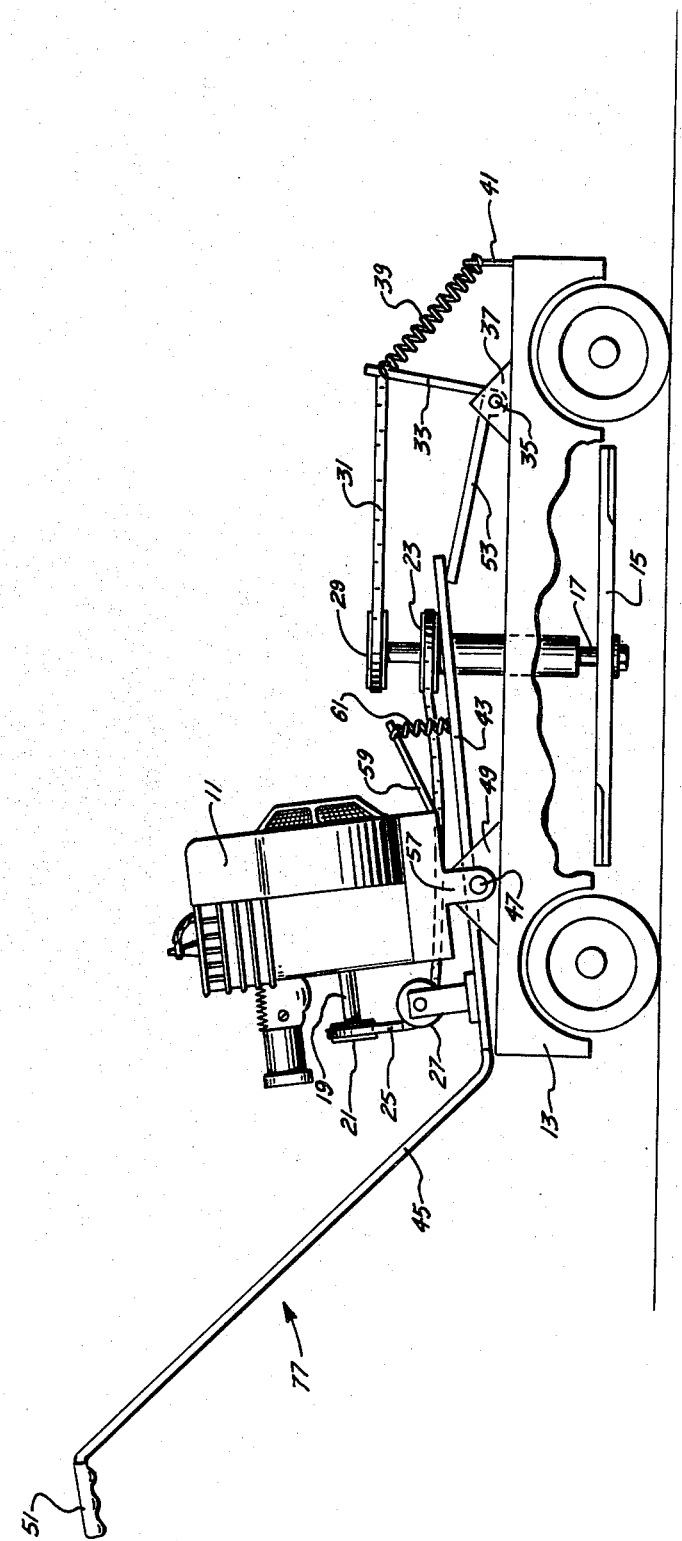
FIG. 4 is a side elevation, partly broken away, of a particularly preferred form of walk behind mower of this invention with the handle shown in the normal rearward position wherein the braking system is applied and the power transmission system is disconnected.
Figure 5:
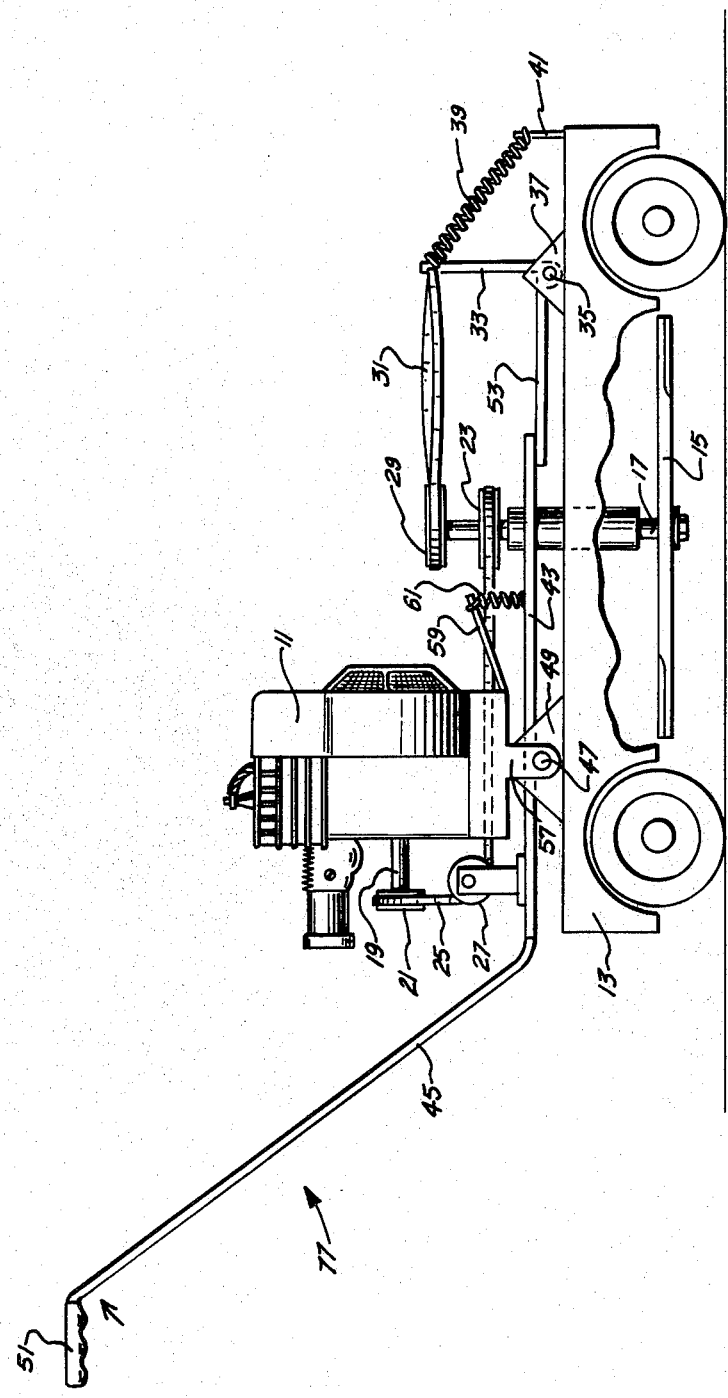
FIG. 5 is a side elevation, partly broken away, of the mower of FIG. 4 but with the handle in the forward position, the braking system released, and the power transmission system connected.

As can be seen by comparing FIG. 2 with FIG. 3 or FIG. 4 with FIG. 5, when handle 77 is pushed from its normal rearward position to its forward position, drive belt 25, which normally has some slack, is tightened by the movement or displacement of engine 11, and more particularly pulley 21, relative to pulley 23. Consequently, forward pressure on the handle causes connection or engagement of the power transmission system as well as concurrent release of the braking system.

Figure 9:
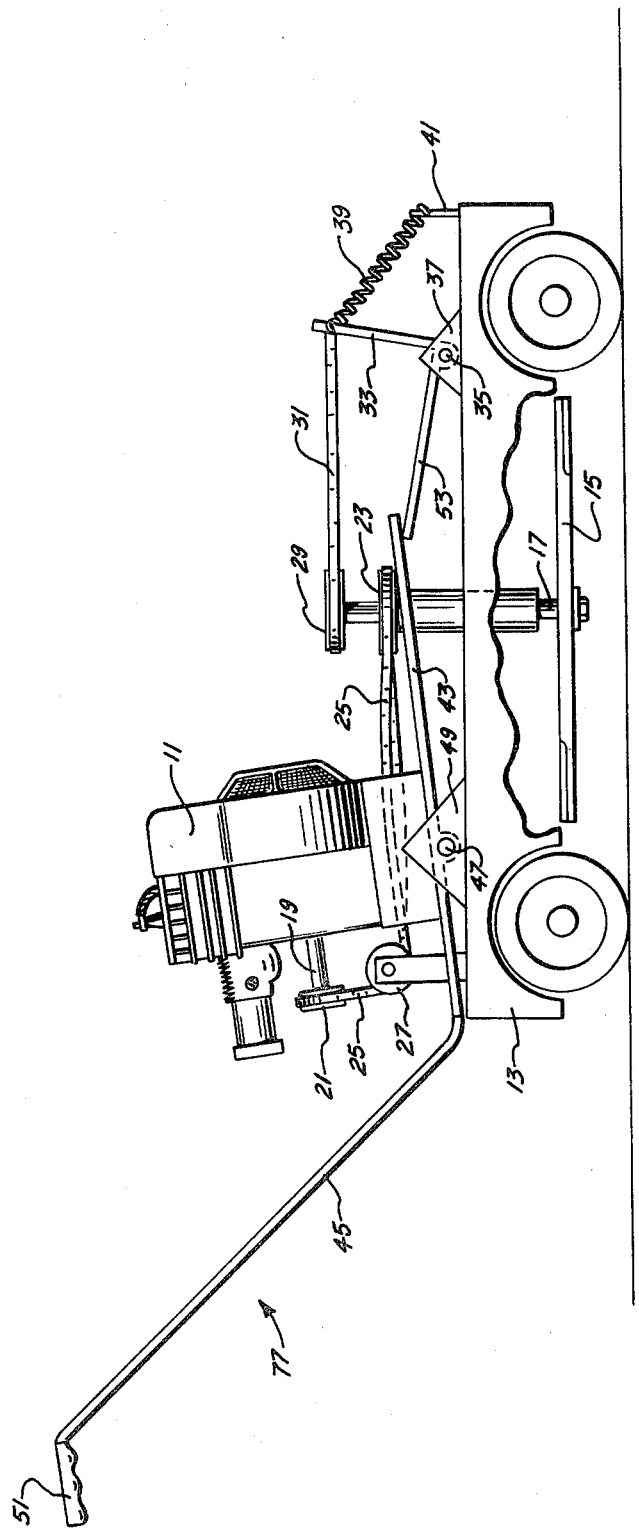
FIGS. 9, 10, 11 and 12 are variants of the mowers as depicted in FIGS. 2, 3, 4 and 5 respectively.
Figure 10:
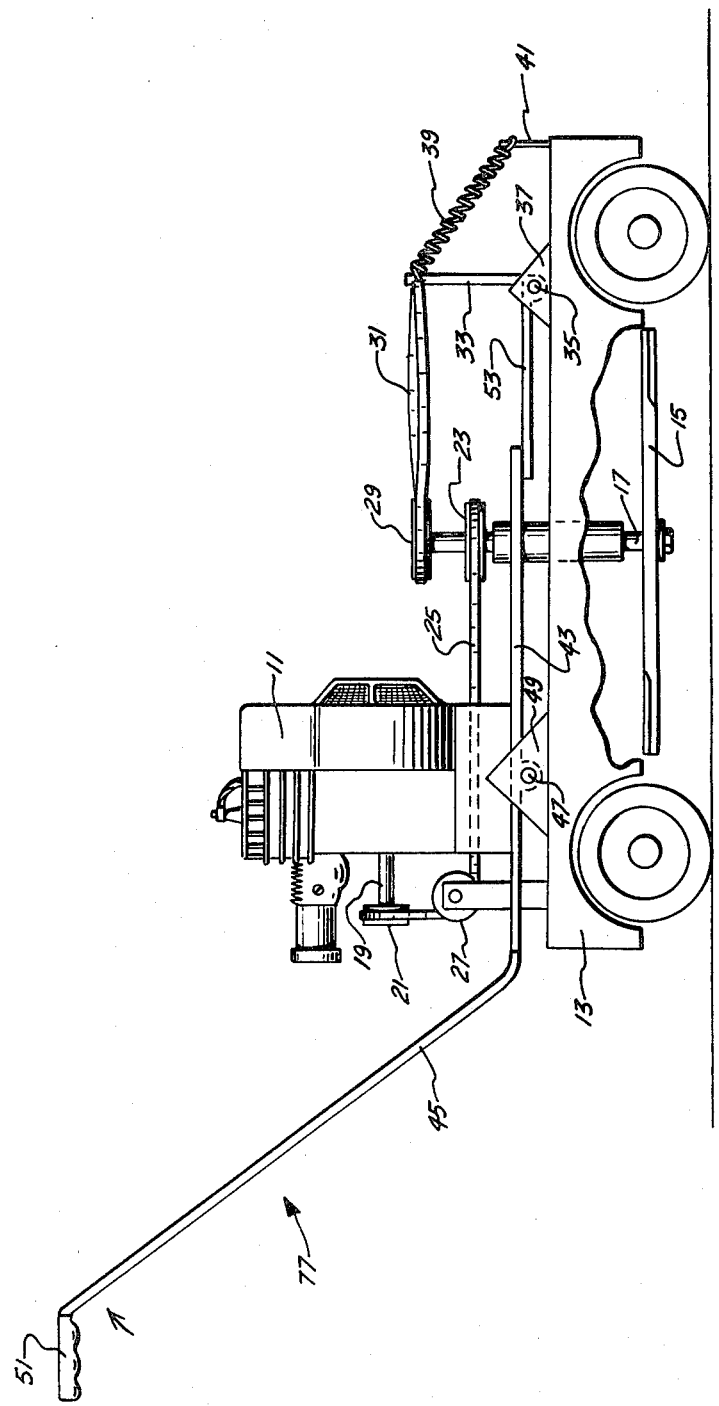
Figure 11:
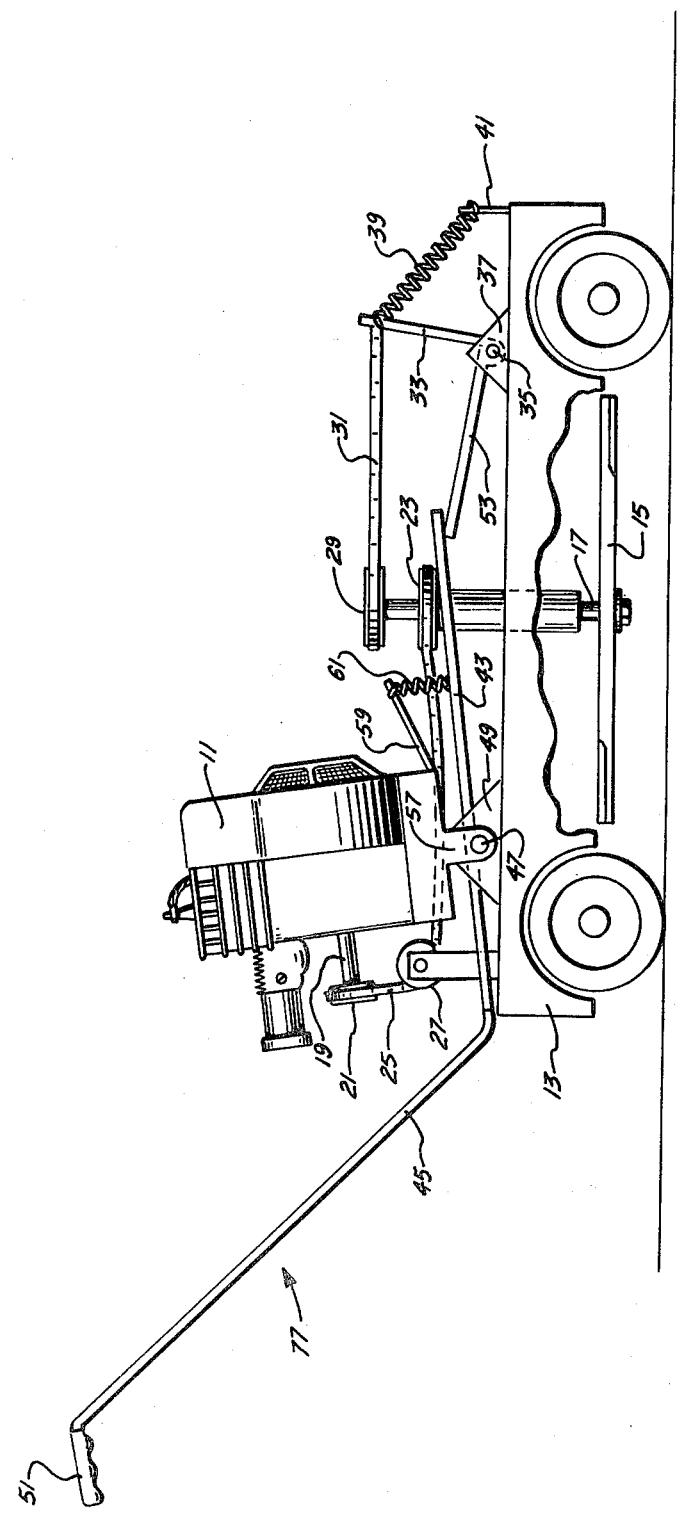
Figure 12:
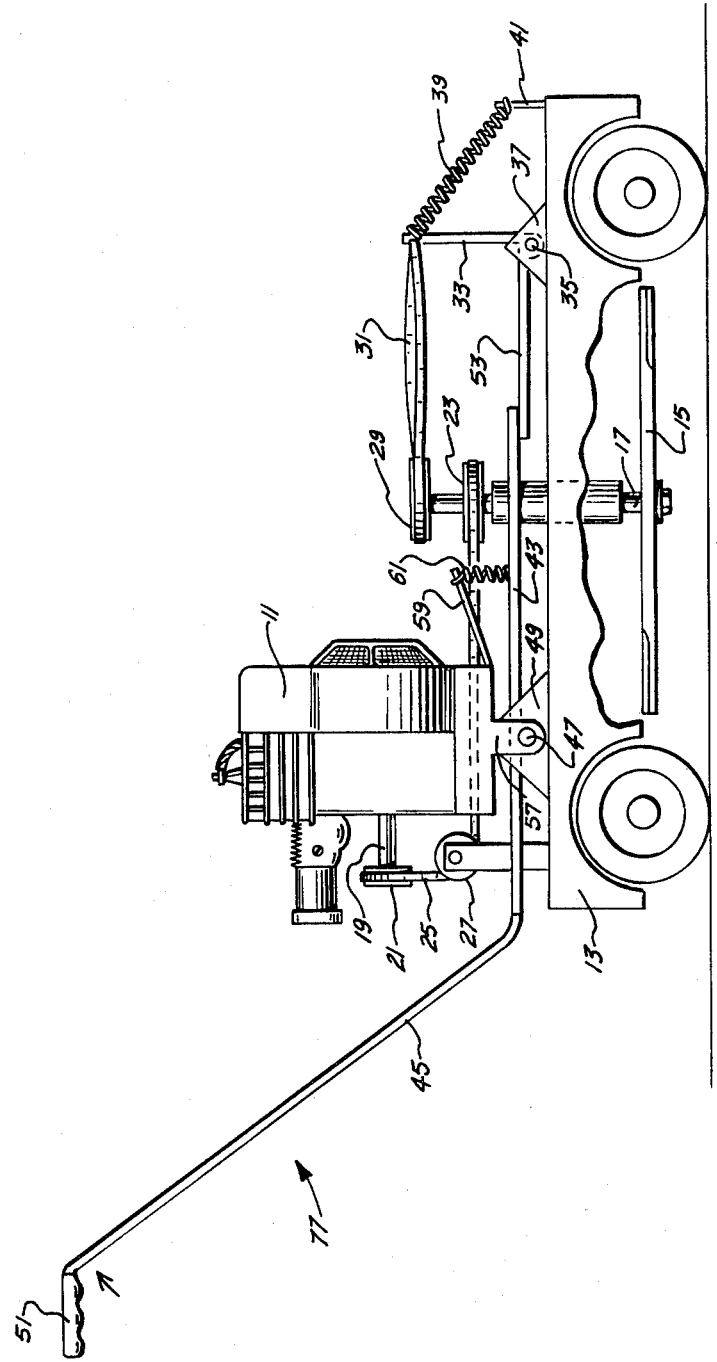

The variant depicted in FIGS. 9-12 involves securing the idler pulleys 27, 27 to body 13 of the mower and in this case when handle 77 is pushed from its normal rearward position shown in FIGS. 9 and 11 to its forward position shown in FIGS. 10 and 12, drive belt 25, which normally has some slack, is tightened by the movement or displacement of engine 11, and more particularly pulley 21 relative to idler pulleys 27, 27 and pulley 23. Consequently, here again forward pressure on the handle causes connection or engagement of the power transmission system as well as concurrent release of the braking system.

In the mower depicted in FIGS. 1-3 and 9-10 engine 11 is mounted on and carried by generally horizontal segments 43, 43 of handle 77.

In the particularly preferred embodiments depicted in FIGS. 4 and 5 and in FIGS. 11 and 12, engine 11 is itself pivotally mounted on axle 47 by means of laterally positioned upwardly extending pivot supports 57, 57 (only one of which is visible in FIGS. 4, 5, 11 and 12) so that the engine and segments 43, 43 of the handle are capable of limited independent pivotal rotation on axle 47 between forward and rearward positions. Projecting forwardly from the mount of engine 11 is an arm or shaft 59 connected to segments 43, 43 by means of coil spring 61 attached to a suitably positioned cross-bar (not shown) extending between the laterally spaced segments 43, 43. In this embodiment, spring 61 serves a dual function. First of all, when forward pressure is applied upon handle 77 by the operator so that segments 43, 43 are pivoted from a position as shown in FIG. 4 to a position as shown in FIG. 5, spring 61 being a connector between segments 43, 43 and shaft 59 transmits the pulling force from segments 43, 43 to shaft 59. By transmitting the pulling force in this manner spring 61 thus makes it possible for engine 11 and segments 43, 43 to pivot in unison as the forward pressure is applied to the upper portion of the handle.

Secondly, spring 61 serves as a force absorbing means. More particularly, because of the length of handle 77 and the consequent leverage it supplies, considerable force can be exerted upon engine 11 and its power transmission system when the engine is mounted on segments 43, 43. This can result in stretching or in severe cases, breakage of drive belt 25. However, by coupling the engine to the handle by means of spring 61, if and when the force exerted upon the engine and its power transmission system exceeds the force rating of the spring, the spring undergoes extension and thereby dissipates the excess force. Consequently, an excessive amount of force is not applied to the engine and to its tightened belt and pulley system when the operator applies forward pressure upon the handle to cause the cutting blades to operate. In short, spring 61 also serves as a force absorbing means protecting against the application of a force in excess of a predetermined amount of force.

Figure 6:
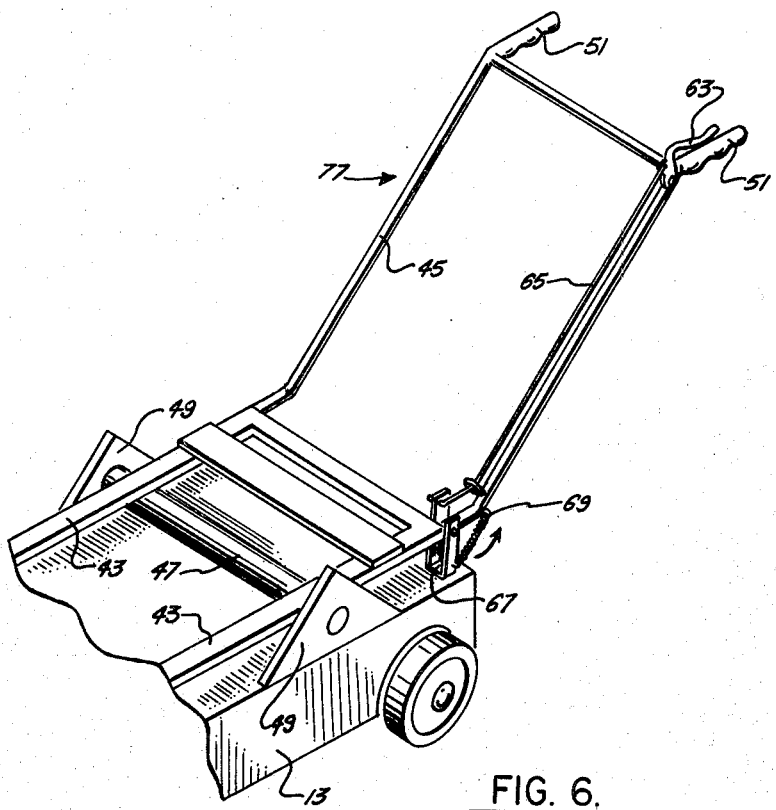
FIG. 6 is a fragmentary view in perspective of a walk behind mower of this invention equipped with manually actuatable locking means in the position occupied while being manually actuated by the operator.
Figure 7:
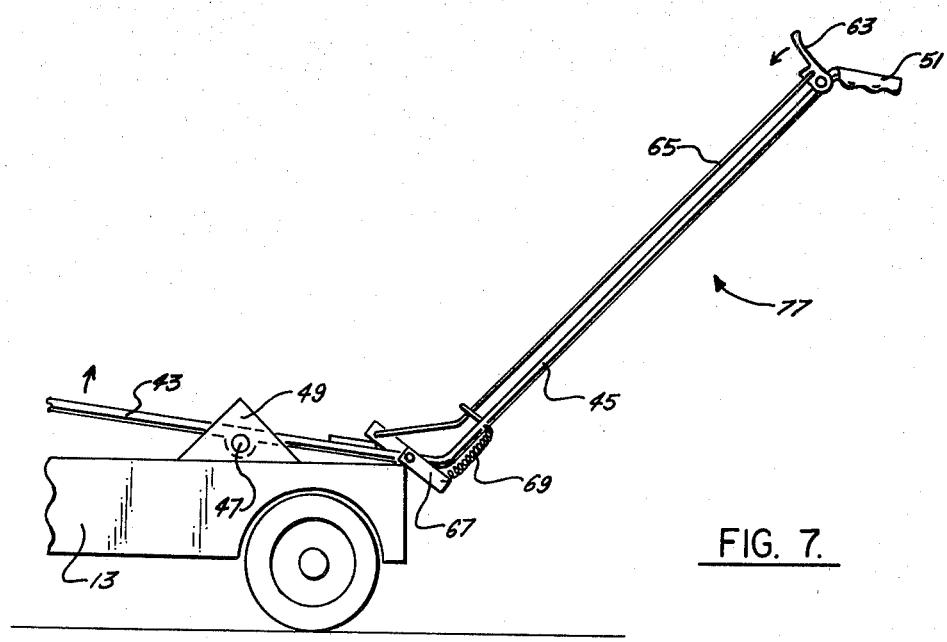
FIG. 7 is a fragmentary side elevation of the mower and locking means of FIG. 6, the locking means being depicted in their normal non-actuated position.
Figure 13:
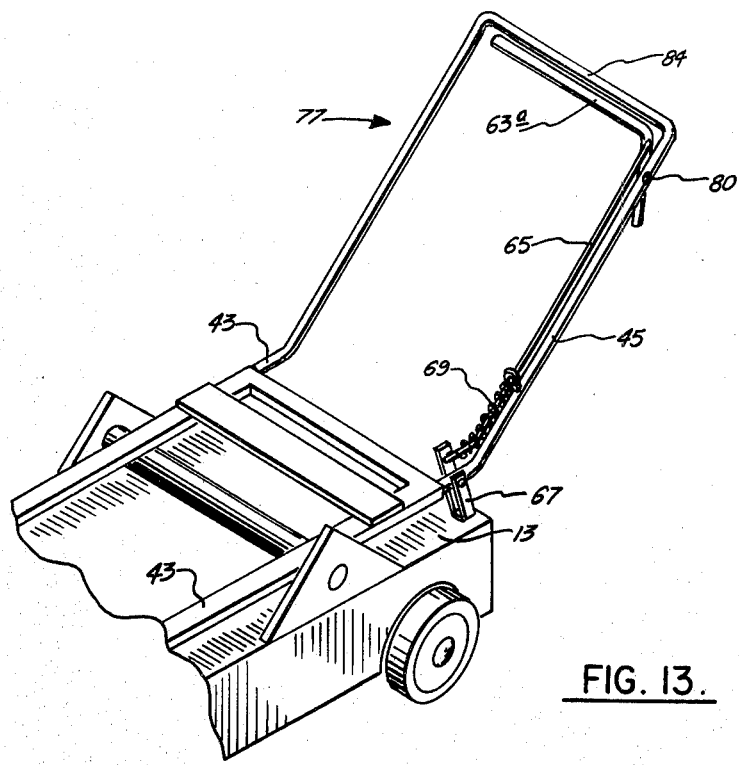
FIG. 13 is a fragmentary view in perspective of a walk behind mower of this invention equipped with a preferred form of manually actuatable locking means in the position occupied while being manually actuated by the operator.
Figure 14:
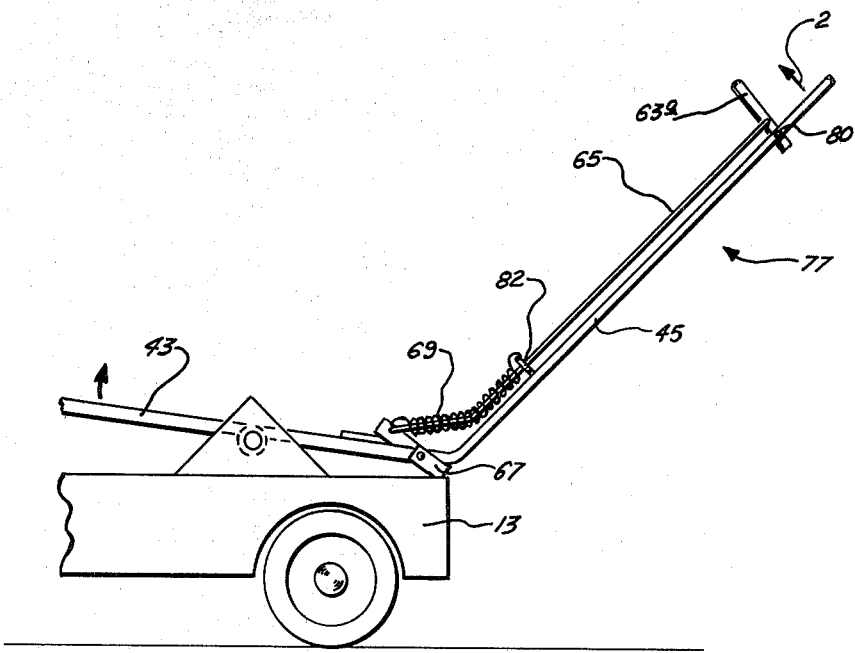
FIG. 14 is a fragmentary side elevation of the mower and locking means of FIG. 13, the locking means being depicted in their normal non-actuated position.

The embodiments illustrated in FIGS. 6 and 7 and in FIGS. 13 and 14 represent still other preferred embodiments of the invention. As noted above, the power transmission system is disengaged and the braking system is applied when handle 77 is in its rearward position. Thus whenever it might become necessary for the operator to pull downwardly on the handle in order to raise the front wheels of the operating mower for the purpose of steering or the like, the blades would normally be stopped by the braking system of this invention. The locking means or systems illustrated in FIGS. 6 and 7 and in FIGS. 13 and 14 make it possible for the operator to pull downwardly on the handle without stopping the blades. But at the same time the operator cannot release the mower and leave the blades in operation; release of the mower results in stoppage of the blades although of course the motor or engine remains in operation.

In the form depicted in FIGS. 6 and 7, the locking means comprise hand lever 63, pull rod 65, brace 67 and spring 69. Lever 63 is pivotally mounted to the handle near one of the hand grips 51 so that this hand grip and lever 63 may be gripped by one hand. Brace 67 is pivotally mounted on handle 77, preferably near the rear of segment 43 (as shown). Brace 67 is of a length sufficient to hold segment 43 in its horizontal position above body 13 and is positioned so that it can be rotated into the space between segment 43 and body 13 (note FIG. 6). Spring 69 exerts a continual force upon brace 67 tending to pull the brace into its normal retracted position (note FIG. 7).

Pull rod 65 is connected between lever 63 and brace 67. To operate the locking system, when the operator is applying forward pressure upon the handle 77 so that segment 43 is in the position shown in FIG. 6 (and the cutting blades are thus in operation), the operator draws hand lever 63 backward from the position shown in FIG. 7 to that shown in FIG. 6. This causes pull rod 65 to rotate brace 67 into the wedging position shown in FIG. 6 to hold segment 43 in the horizontal position. Thus the braking system remains disengaged and the power transmission system remains in operation so that the blades continue to operate even though the operator pulls downwardly on the hand grips 51, 51 so long as the operator is likewise squeezing hand lever 63 against its adjacent hand grip 51. When hand lever 63 is released, spring 69 pulls brace 67 out from between segment 43 and body 13 so that it retracts to the position shown in FIG. 7. Thus if the operator then releases the handle, handle 77 assumes the position shown in FIG. 7 and the blades are promptly stopped by the braking system.

In the preferred form depicted in FIGS. 13 and 14, the locking means comprise hand-bar 63a, pull rod 65, brace 67 and spring 69. Hand-bar 63a is pivotally mounted on handle 77 at 80. Brace 67 is pivotally mounted on handle 77, preferably near the rear of segment 43 (as shown). Spring 69 is fastened at one end to the upper portion of brace 67 an at its other end to lug 82 which preferably is positioned on the lower portion of segment 45 (as shown) so that the tension of the spring will cause the lower portion of brace 67 to pivot forwardly when handle 77 is moved forwardly (as indicated by arrow 2 of FIG. 14) by application of forward pressure on cross-bar 84 by the operator. The lower portion of brace 67 thus moves forwardly on and over the upper surface of body 13 as this forward pressure is applied by the operator until segment 43 becomes generally parallel to the upper surface of body 13 (as depicted in FIG. 13). At this point brace 67 has reached a tilted or cocked position as depicted in FIG. 13 and is at an angle at which the friction between the base of brace 67 and the upper surface of body 13 upon which it rests would be insufficient in and of itself to prevent the downward pressure on the rearward portion of segment 43 (downward pressure due to the weight of the engine and the rearwardly extending portions of handle 77) from forcing the brace back to the position shown in FIG. 14.

As the handle is being moved forwardly by the operator as indicated by arrow 2 from the position of FIG. 14 to that of FIG. 13, spring 69 not only pivots the lower portion of brace 67 into the tilted or cocked position of FIG. 13 but it simultaneously pushes pull rod 65 so that hand-bar 63a is pivoted to a position in close proximity to cross-bar 84 whereby the operator, by extending his fingers, can grasp both cross-bar 84 and hand-bar 63a without releasing the grip on cross-bar 84. Thus, by grasping both of these cross members at the same time, the operator applies a sufficient manual pull on pull rod 65 to keep brace 67 in the position of FIG. 14 even when the operator is pulling down on cross-bar 84 to raise the front end of the mower. In short, the combination of the frictional resistance between the bottom of brace 67 and the upper surface of body 13 on which it rests when in the tilted or cocked position depicted in FIG. 13 plus the leverage applied to brace 67 by the manual grasping of hand-bar 63a keeps brace 67 in the tilted or cocked position of FIG. 13 so long as the operator continues to grasp both hand-bar 63a and cross-bar 84. During this time the power is transmitted to the cutting blades, the braking system is disengaged and thus the cutting blades are in operation. But when the operator releases hand-bar 63a and cross-bar 84, the weight of the engine and handle causes brace 67 to retract into the position shown in FIG. 14 and concurrently the braking system of this invention is automatically engaged and the power transmission system of this invention is automatically disengaged with the result that the blades are quickly stopped even while the engine continues to run.

Figure 8:
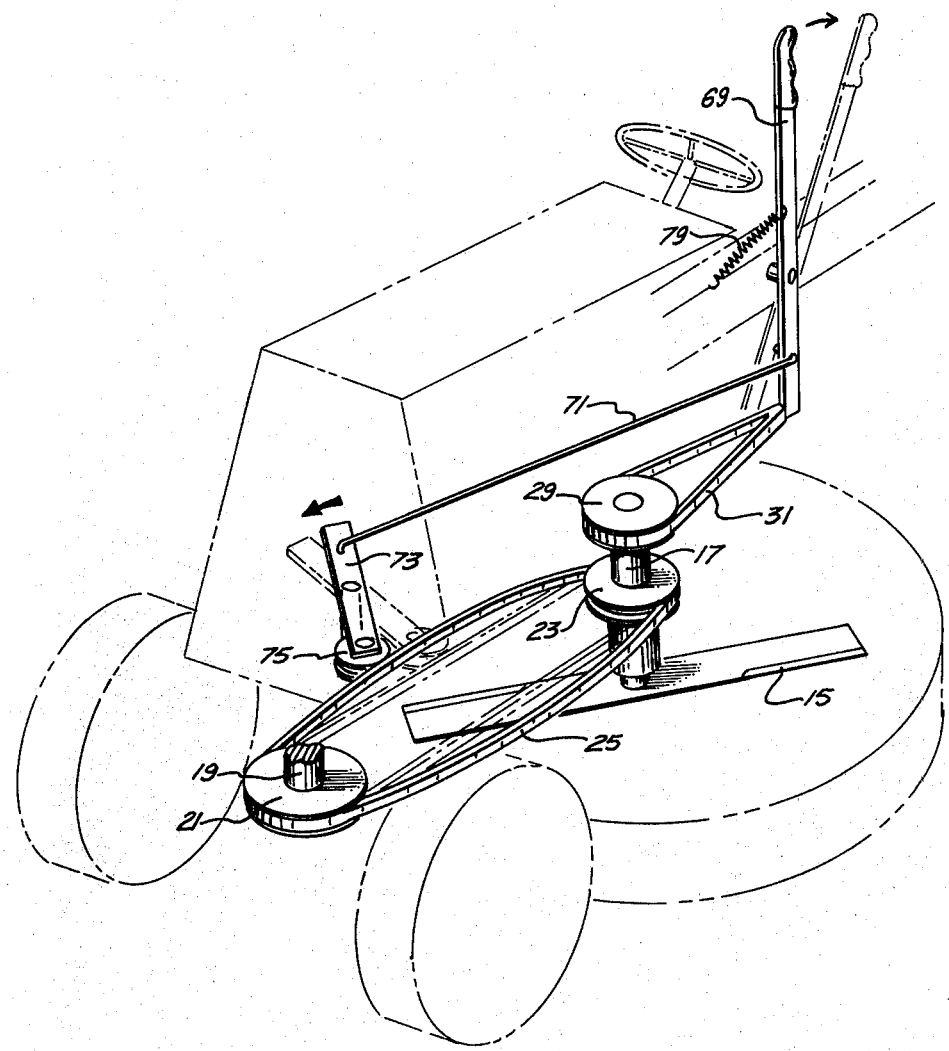
FIG. 8 is a phantom fragmentary view of a rider-type mower of this invention and showing one way of utilizing the principles of this invention in enhancing the safety of rider-type mowers.

The arrangement depicted in FIG. 8 for a riding mower involves handle 69, push rod 71, bar 73, wheel 75, and spring 79 together with elements already discussed hereinabove. Handle 69 is pivotally mounted intermediate its length onto the mower body (as shown). Wheel 75 is pivotally mounted on bar 73 which in turn is pivotally mounted on a suitable support on the mower. When handle 69 is in the forward position (as shown) drive belt 25 has some slack and thus shaft 19 and pulley 21 do not drive pulley 23, shaft 17 or blades 15. In this position, stationary belt 31, which is secured to the lower end of handle 69, tightly engages stop pulley 29. By pulling back on handle 69, rod 71 forces bar 73 to rotate into the position shown by phantom lines whereby wheel 75 presses against and tightens drive belt 25. Concurrently stationary belt 31 is loosened. Thus in this position the braking system is not applied and the blades 15 are driven by the engine (not shown). Spring 79 tends to pull handle 69 into its forward position and thus as soon as the operator releases the handle, the system of this invention causes the blades to stop rotating.

It is thought that the invention and many of its attendant advantages will be understood from the foregoing description and it will be apparent that various changes may be made in the form, construction, and arrangement of the parts without departing from the spirit and scope of this invention, the forms hereinbefore described being merely preferred embodiments thereof.

I claim:

1. In a walk behind rotary power mower comprising an engine, rotatable grass cutting means, and rotatable power transmission means operatively connecting the engine with the rotatable grass cutting means to cause rotation thereof, the improvement wherein said mower further includes:
   (a) means for disconnecting said power transmission means;
   (b) braking means for stopping rotation of said cutting means, said braking means comprising
      (i) a pulley operatively connected with said grass cutting means, and
      (ii) a belt adapted to be brought into frictional engagement with said pulley but fixed so that it cannot rotate with the pulley, the belt being adapted to stop rotation of the pulley;
   (c) means causing said belt to be brought into frictional engagement with said pulley concurrently with the disconnection of said power transmission means;
   (d) a handle comprising a generally horizontal segment and an upwardly and rearwardly extending segment adapted to be grasped at its upper portion by the operator, said handle being pivotally mounted to the mower at laterally positioned points of rotation intermediate the length of said generally horizontal segment so that
      (i) when said handle is pivoted into a forward position on the mower by the application of forward pressure upon said handle, said power transmission means operatively connect the engine with said grass cutting means, and
      (ii) when said handle is pivoted into a rearward position on said mower, said power transmission means is disconnected and concurrently said belt is brought into frictional engagement with said pulley thereby stopping rotation of said grass cutting means;

the mower being further characterized in that
   (e) said pulley is mounted on an upstanding shaft to which said cutting means are secured;
   (f) the engine is mounted above said generally horizontal segment of the handle and rearwardly of said pulley, with the center of gravity of the engine being between and to the rear of said laterally positioned points of rotation;
   (g) said belt is secured to a member mounted on said mower forwardly of said pulley and adapted to pivot forwardly and backwardly, backward pivoting of said member causing said belt to loosen from said pulley and forward pivoting of said member causing said belt to tighten on and frictionally engage said pulley;
   (h) tension means are positioned on said mower to continuously apply a force upon said member tending to cause said member to pivot forwardly;
   (i) said transmission means comprise a belt and a pulley system for rotating said shaft and said cutting means; and
   (j) said member includes a rearwardly projecting lever arm engageable by the forward end portion of said generally horizontal segment of the handle so that when said handle is pivoted into a forward position on the mower by the application of forward pressure upon said handle
      (i) said belt and pulley system is tightened by displacement of the engine relative to said belt and pulley system whereby said shaft and said cutting means are rotated and
      (ii) the forward end portion of said generally horizontal segment of the handle applies a force upon said lever arm in excess of the opposing force continuously applied upon said member by said tension means whereby said member is caused to pivot backwardly to cause said first-named belt to be frictionally disengaged from the pulley of said braking means.

2. The apparatus of 1 further characterized in that it includes manually actuatable locking means associated with said handle to lock the handle in said forward position during the time said locking means are being manually actuated by the operator.

3. In a walk behind rotary power mower comprising an engine, rotatable grass cutting means, and rotatable power transmission means operatively connecting the engine with the rotatable grass cutting means to cause rotation thereof, the improvement wherein said mower further includes:
   (a) means for disconnecting said power transmission means;
   (b) braking means for stopping rotation of said cutting means, said braking means comprising
      (i) a pulley operatively connected with said grass cutting means, and
      (ii) a belt adapted to be brought into frictional engagement with said pulley but fixed so that it cannot rotate with the pulley, the belt being adapted to stop rotation of the pulley;
   (c) means causing said belt to be brought into frictional engagement with said pulley concurrently with the disconnection of said power transmission means;
   (d) a handle comprising a generally horizontal segment and an upwardly and rearwardly extending segment adapted to be grasped at its upper portion by the operator, said handle being pivotally mounted to the mower at laterally positioned points of rotation intermediate the length of said generally horizontal segment so that
  (i) when said handle is pivoted into a forward position on the mower by the application of forward pressure upon said handle, said power transmission means operatively connect the engine with said grass cutting means, and
  (ii) when said handle is pivoted into a rearward position on said mower, said power transmission means is disconnected and concurrently said belt is brought into frictional engagement with said pulley thereby stopping rotation of said grass cutting means;
the mower being further characterized in that
  (e) said belt is secured to a member mounted on said mower forwardly of said pulley and adapted to pivot forwardly and backwardly, backward pivoting of said member causing said belt to loosen from said pulley and forward pivoting of said member causing said belt to tighten on and frictionally engage said pulley; and in that
  (f) said member includes a rearwardly projecting lever arm engageable by the forward end portion of said generally horizontal segment of the handle so that when said handle is pivoted into a forward position on the mower by the application of forward pressure upon said handle, the forward end portion of said generally horizontal segment of the handle applies a force upon said lever arm to cause said member to pivot backwardly.

4. The apparatus of claim 3 wherein said power transmission means comprise a belt and pulley system.

5. The apparatus of claim 3 wherein said pulley is mounted on an upstanding shaft to which said cutting means are secured.

6. The apparatus of claim 3 wherein said power transmission means comprise a mule drive belt and pulley system.

7. The apparatus of claim 3 further characterized in that the engine is mounted above said generally horizontal segment with the center of gravity of the engine between and to the rear of said laterally positioned points of rotation.

8. The apparatus of claim 7 further characterized in that the engine is mounted on the mower by means of upwardly extending pivotally mounted supports so that the engine and said generally horizontal segment of the handle are capable of limited independent pivotal rotation between forward and rearward positions.

9. The apparatus of claim 8 further characterized in that the engine is connected to said generally horizontal segment by force absorbing means capable of transmitting a pulling force to cause the engine to pivotally rotate into the forward position when said handle is pivoted into the forward position on the mower by the application of forward pressure upon said handle, said force absorbing means dissipating force in excess of a predetermined amount of force thereby preventing an excessive amount of force being applied to the engine by the application of the forward pressure upon said handle.

10. The apparatus of claim 9 wherein said force absorbing means comprise one or more extensible coil springs.

11. The apparatus of 3 further characterized in that it includes manually actuatable locking means associated with said handle to lock the handle in said forward position during the time said locking means are being manually actuated by the operator.

12. In a walk behind rotary power mower comprising an engine, rotatable grass cutting means, and rotatable power transmission means operatively connecting the engine with the rotatable grass cutting means to cause rotation thereof, the improvement wherein said mower further includes:
  (a) means for disconnecting said power transmission means;
  (b) braking means for stopping rotation of said cutting means, said braking means comprising
    (i) a pulley operatively connected with said grass cutting means, and
    (ii) a belt adapted to be brought into frictional engagement with said pulley but fixed so that it cannot rotate with the pulley, the belt being adapted to stop rotation of the pulley;
  (c) means causing said belt to be brought into frictional engagement with said pulley concurrently with the disconnection of said power transmission means;
  (d) a handle comprising a generally horizontal segment and an upwardly and rearwardly extending segment adapted to be grasped at its upper portion by the operator, said handle being pivotally mounted to the mower at laterally positioned points of rotation intermediate the length of said generally horizontal segment so that
    (i) when said handle is pivoted into a forward position on the mower by the application of foward pressure upon said handle, said power transmission means operatively connect the engine with said grass cutting means, and
    (ii) when said handle is pivoted into a rearward position on said mower, said power transmission means is disconnected and concurrently said belt is brought into frictional engagement with said pulley thereby stopping rotation of said grass cutting means;
  the mower being further characterized in that
  (e) said belt is secured to a member mounted on said mower forwardly of said pulley and adapted to pivot forwardly and backwardly, backward pivoting of said member causing said belt to loosen from said pulley and forward pivoting of said member causing said belt to tighten on and frictionally engage said pulley; in that
  (f) tension means are positioned on said mower to continuously apply a force upon said member tending to cause said member to pivot forwardly; and in that
  (g) said member includes a rearwardly projecting lever arm engageable by the forward end portion of said generally horizontal segment of the handle so that when said handle is pivoted into a forward position on the mower by the application of forward pressure upon said handle, the foward end portion of said generally horizontal segment of the handle applies a force upon said lever arm in excess of the opposing force continuously applied upon said member by said tension means whereby said member is caused to pivot backwardly.

13. The apparatus of claim 12 further characterized by having manually actuatable locking means associated with said handle to lock the handle in said forward position during the time said locking means are being manually actuated by the operator.

14. The apparatus of claim 12 further characterized in that the engine is mounted on the mower by means of upwardly extending pivotally mounted supports so that the engine and said generally horizontal segment of the handle are capable of limited independent pivotal rotation between forward and rearward positions.

15. The apparatus of claim 14 further characterized in that the engine is connected to said generally horizontal segment by force absorbing means capable of transmitting a pulling force to cause the engine to pivotally rotate into the forward position when said handle is pivoted into the forward position on the mower by the application of forward pressure upon said handle, said force absorbing means dissipating force in excess of a predetermined amount of force thereby preventing an excessive amount of force being applied to the engine and to said tightened belt and pulley system by the application of the forward pressure upon said handle.

16. In a walk behind rotary power mower comprising an engine, rotatable grass cutting means, and rotatable power transmission means operatively connecting the engine with the rotatable grass cutting means to cause rotation thereof, the improvement wherein said mower further includes:
   (a) means for disconnecting said power transmission means;
   (b) braking means for stopping rotation of said cutting means, said braking means comprising
      (i) a pulley operatively connected with said grass cutting means, and
      (ii) a belt adapted to be brought into frictional engagement with said pulley but fixed so that it cannot rotate with the pulley, the belt being adapted to stop rotation of the pulley;
   (c) means causing said belt to be brought into frictional engagement with said pulley concurrently with the disconnection of said power transmission means;
   (d) a handle comprising a generally horizontal segment and an upwardly and rearwardly extending segment adapted to be grasped at its upper portion by the operator, said handle being pivotally mounted to the mower at laterally positioned points of rotation intermediate the length of said generally horizontal segment so that
      (i) when said handle is pivoted into a forward position on the mower by the application of forward pressure upon said handle, said power transmission means operatively connect the engine with said grass cutting means, and
      (ii) when said handle is pivoted into a rearward position on said mower, said power transmission means is disconnected and concurrently said belt is brought into frictional engagement with said pulley thereby stopping rotation of said grass cutting means; and
   (e) manually actuatable locking means associated with said handle to lock the handle in said forward position during the time said locking means are being manually actuated by the operator, said locking means including
      (i) a brace pivotally mounted at the rearward base of said handle, and
      (ii) a hand control connected to said brace, the hand control being mounted on the handle and adapted to be manually actuated by the operator guiding the mower so that manual actuation of the control causes said brace to be pivoted forwardly from a normally retracted rearward position to a frontal position in which it secures said handle in said forward position on the mower, and release of the manual actuation of the control causes said brace to return to its normally retracted rearward position.

17. The apparatus of claim 16 further characterized in that said belt is secured to a member mounted on said mower forwardly of said pulley and adapted to pivot forwardly and backwardly, backward pivoting of said member causing said belt to loosen from said pulley and forward pivoting of said member causing said belt to tighten on and frictionally engage said pulley.

18. The apparatus of claim 16 further characterized in that said handle is pivoted into said rearward position at least in part by the weight of said engine.

19. The apparatus of claim 7 further characterized in that tension means are positioned on said mower to continuously apply a force upon said member tending to cause said member to pivot forwardly.

20. The apparatus of claim 19 wherein said tension means comprise one or more coil springs.

21. The apparatus of claim 17 further characterized in that said member includes a rearwardly projecting lever arm engageable by the forward end portion of said generally horizontal segment of the handle so that when said handle is pivoted into a forward position on the mower by the application of forward pressure upon said handle, the forward end portion of said generally horizontal segment of the handle applies a force upon said lever arm to cause said member to pivot backwardly.

22. The apparatus of claim 17 further characterized in that
   (i) tension means are positioned on said mower to continuously apply a force upon said member tending to cause said member to pivot forwardly; and
   (ii) said member includes a rearwardly projecting lever arm engageable by the forward end portion of said generally horizontal segment of the handle so that when said handle is pivoted into a forward position on the mower by the application of forward pressure upon said handle, the forward end portion of said generally horizontal segment of the handle applies a force upon said lever arm in excess of the opposing force continuously applied upon said member by said tension means whereby said member is caused to pivot backwardly.

23. The apparatus of claim 17 further characterized in that
   (i) said pulley is mounted on an upstanding shaft to which said cutting means are secured;
   (ii) the engine is mounted above said generally horizontal segment of the handle and rearwardly of said pulley, with the center of gravity of the engine being between and to the rear of said laterally positioned points of rotation;
   (iii) tension means are positioned on said mower to continuously apply a force upon said member tending to cause said member to pivot forwardly;
   (iv) said transmission means comprise a belt and a pulley system for rotating said shaft and said cutting means; and (v) said member includes a rearwardly projecting lever arm engageable by the forward end portion of said generally horizontal segment of the handle so that when said handle is pivoted into a forward position on the mower by the application of forward pressure upon said handle (a) said belt and pulley system is tightened by displacement of the engine relative to said belt and pulley system whereby said shaft and said cutting means are rotated and (b) the forward end portion of said generally horizontal segment of the handle applies a force upon said lever arm in excess of the opposing force continuously applied upon said member by said tension means whereby said member is caused to pivot backwardly to cause said first-named belt to be frictionally disengaged from the pulley of said braking means.

24. The apparatus of claim 16 further characterized in that the power transmission means comprise a mule drive belt and pulley system.

25. The apparatus of claim 16 further characterized in that the engine is mounted on the mower by means of upwardly extending pivotally mounted supports so that the engine and said generally horizontal segment of the handle are capable of limited independent pivotal rotation between forward and rearward positions.

26. The apparatus of claim 25 further characterized in that the engine is connected to said generally horizontal segment by force absorbing means capable of transmitting a pulling force to cause the engine to pivotally rotate into the forward position when said handle is pivoted into the forward position on the mower by the application of forward pressure upon said handle, said force absorbing means dissipating force in excess of a predetermined amount of force thereby preventing an excessive amount of force being applied to the engine and to said tightened belt and pulley system by the application of the forward pressure upon said handle.

27. The apparatus of claim 26 further characterized in that the power transmission means comprise a mule drive belt and pulley system.

28. The apparatus of claim 16 further characterized in that when said brace is in said frontal position it is in a tilted position such that the lower portion of the brace frictionally engages a surface of the mower with an amount of friction insufficient in and of itself to keep said handle in said forward position, said brace being maintainable in said tilted position by the combination of this frictional engagement and a restraining force applied to the brace during and by virtue of the manual actuation of said hand control by the operator.

29. In a walk behind rotary power mower comprising an engine, a deck, rotatable grass cutting means, and rotatable power transmission means operatively connecting the engine with the rotatable grass cutting means to cause rotation thereof, the improvement wherein said mower further includes:

(a) braking means for stopping rotation of said cutting means;

(b) first means for alternatively connecting and disconnecting said power transmission means;

(c) second means for alternatively applying and releasing said braking means;

(d) a handle comprising a generally horizontal lower segment and an upwardly and rearwardly extending upper segment adapted to be grasped at its upper portion by the operator, said handle being pivotally mounted to the mower above said deck and at laterally positioned points of rotation intermediate the length of said lower segment so that (i) when said handle is pivoted from a rearward position into a forward position on the mower by the application of forward pressure upon the upper portion of said handle, said lower segment moves from a first generally horizontal position to a second generally horizontal position and thereby concurrently causes said first means to connect said power transmission means and said second means to release said braking means so that the cutting means are driven by the engine, and (ii) when said handle is pivoted from a forward position into a rearward position on said mower, said lower segment pivots from said second generally horizontal position to said first generally horizontal position and thereby concurrently causes said first means to disconnect said power transmission means and said second means to apply said braking means so that rotation of the cutting means is stopped; and (e) manually actuatable locking means associated with said handle to lock the handle in said forward position during the time said locking means are being manually actuated by the operator, said locking means including (i) a brace pivotally mounted at the rearward base of said handle and adapted to be moved from a normally retracted rearward position into a frontal supporting position between said deck and said lower segment when said handle is in said forward position on the mower, and (ii) a hand control connected to said brace, the hand control being mounted on the handle and adapted to be manually actuated by the operator guiding the mower so that when said handle is in said forward position on the mower manual actuation of the control causes said brace to be pivoted forwardly from its normally retracted rearward position to its frontal supporting position in which it secures said handle in said forward position on the mower, and release of the manual actuation of the control causes said brace to return to its normally retracted rearward position.

30. The apparatus of claim 29 wherein said handle is normally kept in said rearward position on the mower at least in part by the weight of the engine.

31. The apparatus of claim 30 wherein said braking means comprise a pulley operatively connected with said grass cutting means, and a belt adapted to be brought into frictional rotation-stopping engagement with said pulley but fixed so that it cannot rotate with the pulley.

32. The apparatus of claim 31 wherein said power transmission means comprise a belt and pulley system.

33. The apparatus of claim 32 further characterized in that the engine is mounted above the deck on the mower by means of upwardly extending pivotally mounted supports so that the engine and said lower segment of the handle are capable of limited independent pivotal rotation.

34. The apparatus of claim 33 further characterized in that the engine is connected to said lower segment by force absorbing means capable of transmitting a pulling force to cause the engine to pivotally rotate into a forward position when said handle is pivoted into the forward position on the mower by the application of forward pressure upon said handle, said force absorbing means dissipating force in excess of a predetermined amount of force thereby preventing an excessive amount of force being applied to the engine and to said tightened belt and pulley system by the application of the forward pressure upon said handle.

35. The apparatus of claim 34 further characterized in that the power transmission means comprise a mule drive belt and pulley system.

* * * * *